United States Patent [19]
Otterbach et al.

[11] Patent Number: 5,959,766
[45] Date of Patent: Sep. 28, 1999

[54] OPTICAL AMPLIFIER DEVICE

[75] Inventors: Jürgen Otterbach; Thomas Pfeiffer, both of Stuttgart, Germany

[73] Assignee: Alcatel Alsthom Compagnie Generale d'Electric, Paris, France

[21] Appl. No.: 08/894,115

[22] PCT Filed: Dec. 20, 1996

[86] PCT No.: PCT/EP97/00116

§ 371 Date: Apr. 7, 1998

§ 102(e) Date: Apr. 7, 1998

[87] PCT Pub. No.: WO97/23066

PCT Pub. Date: Jun. 26, 1997

[30] Foreign Application Priority Data

Dec. 20, 1995 [DE] Germany ............................ 195 47 603

[51] Int. Cl.$^6$ ................................ H01S 3/06; G02F 1/39
[52] U.S. Cl. ..................... 359/337; 359/161; 359/187; 359/341
[58] Field of Search ...................... 359/134, 160, 359/161, 187, 194, 337, 341

[56] References Cited

U.S. PATENT DOCUMENTS

| | | | |
|---|---|---|---|
| 4,644,145 | 2/1987 | Gundner | 250/201 |
| 5,436,760 | 7/1995 | Nakabayashi . | |
| 5,467,218 | 11/1995 | Takeda et al. . | |
| 5,664,131 | 9/1997 | Sugiya | 359/341 |
| 5,808,785 | 9/1998 | Nakabayashi | 359/341 |

FOREIGN PATENT DOCUMENTS

| | | |
|---|---|---|
| 0663738 | 7/1995 | European Pat. Off. . |
| 07212315 | 8/1995 | Japan . |

OTHER PUBLICATIONS

Chraplyvy et al, IEEE Photonics Tech. Lett., vol. 4, #8, pp. 920–922, Aug. 1992.

Sugaya et al, O & A '95 paper Fc 3, Davas, Switzerland, 4 pages., Jun. 16, 1995.

Nakabayashi et al, Tech Report of IEIce, OCS 94–66, PE 94–89 (1994–11); with Translation, 1994.

Patent Abstract of Japan, vol. 015, No. 480 (P–1284), Dec. 5, 1991 & JP 03 206427 A (Mitsubishi Electric Corp) Sep. 9, 1991.

"Equalization in Amplified WDM Lightwave Transmission Systems" by Chraplyvy et al in IEEE Photonics Technology Letters, vol. 4, No. 8, Aug. 1992, pp. 920–922.

*Primary Examiner*—Nelson Moskowitz
*Attorney, Agent, or Firm*—Ware, Fressola, Van Der Sluys & Adolphson LLP

[57] ABSTRACT

An optical amplifier device (REG) comprises a variable optical attenuator (DG), a control unit (CTRL), and an optical amplifier (EDFA). The gain of the amplifier (EDFA) and the attenuation of the attenuator (DG) are adjusted by the control unit (CTRL) based on a correlation (KOR) of the levels of the optical signals at the output of the optical amplifier (EDFA).

6 Claims, 3 Drawing Sheets

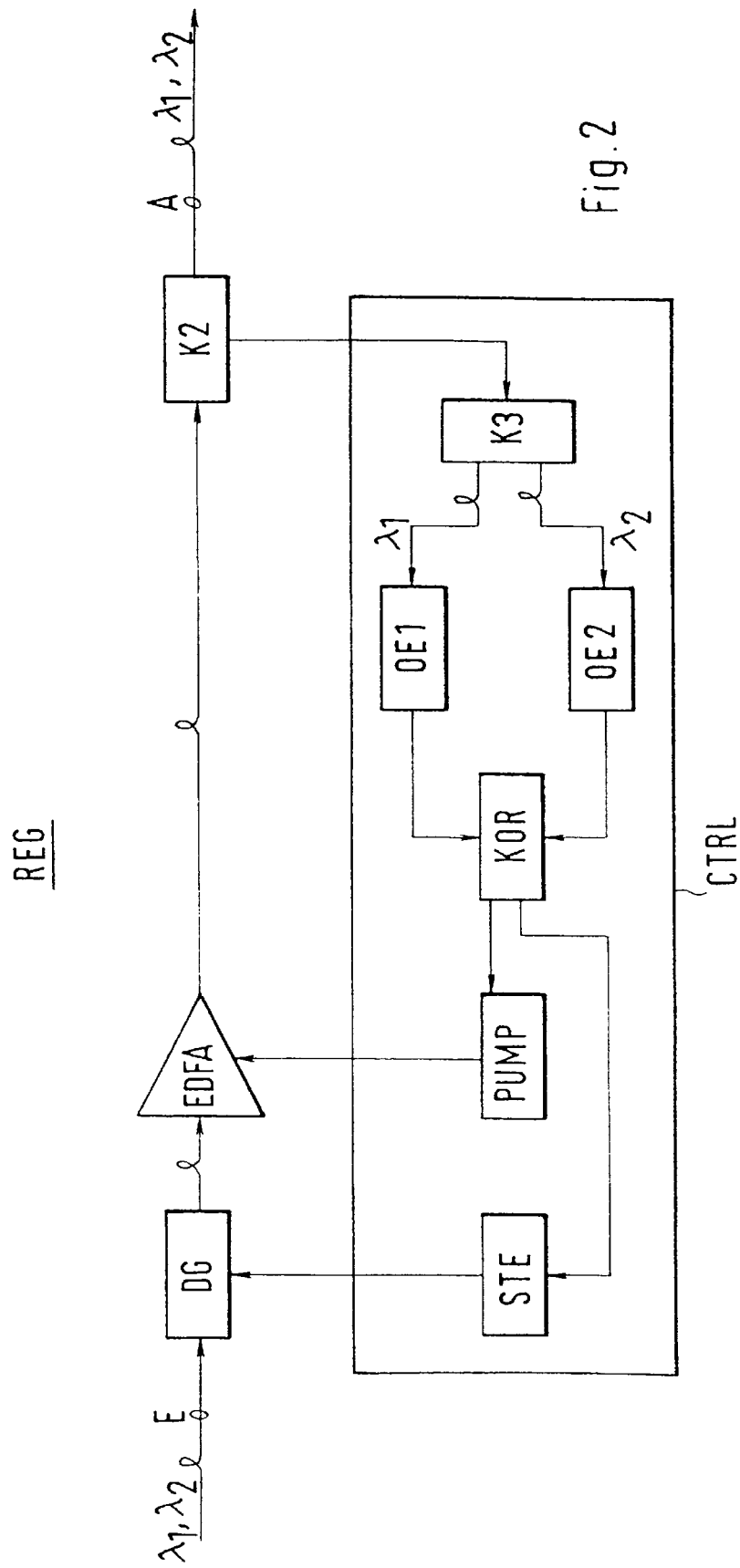

ially different wavelengths which are collectively transmitted via a glass fiber path, by optically manipulating the wavelength-dependent spectrum with erbium-doped fiber amplifiers.

OPTICAL AMPLIFIER DEVICE

TECHNICAL FIELD

The invention concerns an optical amplifier device for transmitting composite signals consisting of optical signals with different wavelengths.

Optical amplifiers are used in optical transmission systems, e.g. cable television distribution systems, and serve to amplify optical signals whose signal level is attenuated by optical components, e.g. couplers or glass fibers. Many optical components cause wavelength-dependent attenuation. If an optical transmission system transmits composite signals consisting of optical signals having respectively different wavelengths, the wavelength-dependent attenuation causes optical signals with different levels to be received at the input of the optical amplifier. The amplifiers amplify the different levels of the optical signals within a predetermined range of the optical input power, which causes the wavelength-dependent attenuation to extend to the subscriber, and thus the transmission range is determined by the wavelength that is attenuated most.

The article "Equalization in Amplified WDM Lightwave Transmission Systems" in IEEE Photonics Letters, Vol. 4, No. 8, August 1992, pages 920–922, describes an optical transmission system wherein composite signals consisting of optical signals with respectively different wavelengths are transmitted by a sending unit to a receiving unit via a glass fiber path. To compensate for the wavelength-dependent attenuation and to provide optical signals of the same level at the receiving unit, the optical signals are transmitted by the sending unit via variable optical attenuators with respectively different signal levels. Optical signals whose wavelengths are attenuated more are transmitted at a higher signal level. A monitoring line is required from the receiving unit to the sending unit to adjust the signal level. Because of the different distances and the different number of optical components between the sending unit and the receiving unit in a branched, e.g. tree-shaped distribution network, it is only conditionally possible to adjust the levels of the optical signals in the direction of the transmission so that the same signal levels are produced in all receiving units.

SUMMARY OF THE INVENTION

It is therefore the task of the invention to provide a device whereby the wavelength-dependent attenuations can be compensated for in a more flexible manner.

This task is fulfilled by an optical amplifier device for transmitting composite signals consisting of optical signals with different wavelengths, the optical amplifier device (REG) comprising a variable attenuator, a variable-gain optical amplifier, a coupler, a composite-signal input, a composite-signal output, and a control unit for determining control signals for the variable attenuator and the variable-gain optical amplifier, wherein the composite-signal input is connected to the composite-signal output via a series combination of the variable attenuator, the variable-gain optical amplifier, and the coupler, wherein a portion of the composite signal at the output of the variable-gain optical amplifier is feedable via the coupler to the control unit, and wherein the control signals are determinable in the control unit from the individual levels of the optical signals of the portion of the composite signal.

A particular advantage of the invention is the increase in the transmission range of optical signals with respectively different wavelengths which are collectively transmitted via a glass fiber path, by optically manipulating the wavelength-dependent spectrum with erbium-doped fiber amplifiers.

BRIEF DESCRIPTION OF THE DRAWINGS

The invention is explained in the following by means of a configuration example with the help of FIGS. 1 to 3, wherein:

FIG. 2 is a schematically illustrated configuration of an amplifier device according to the invention, FIG. 3 has three diagrams wherein the signal level is drawn above the wavelength in each case.

BEST MODE FOR CARRYING OUT THE INVENTION

Figure 1:
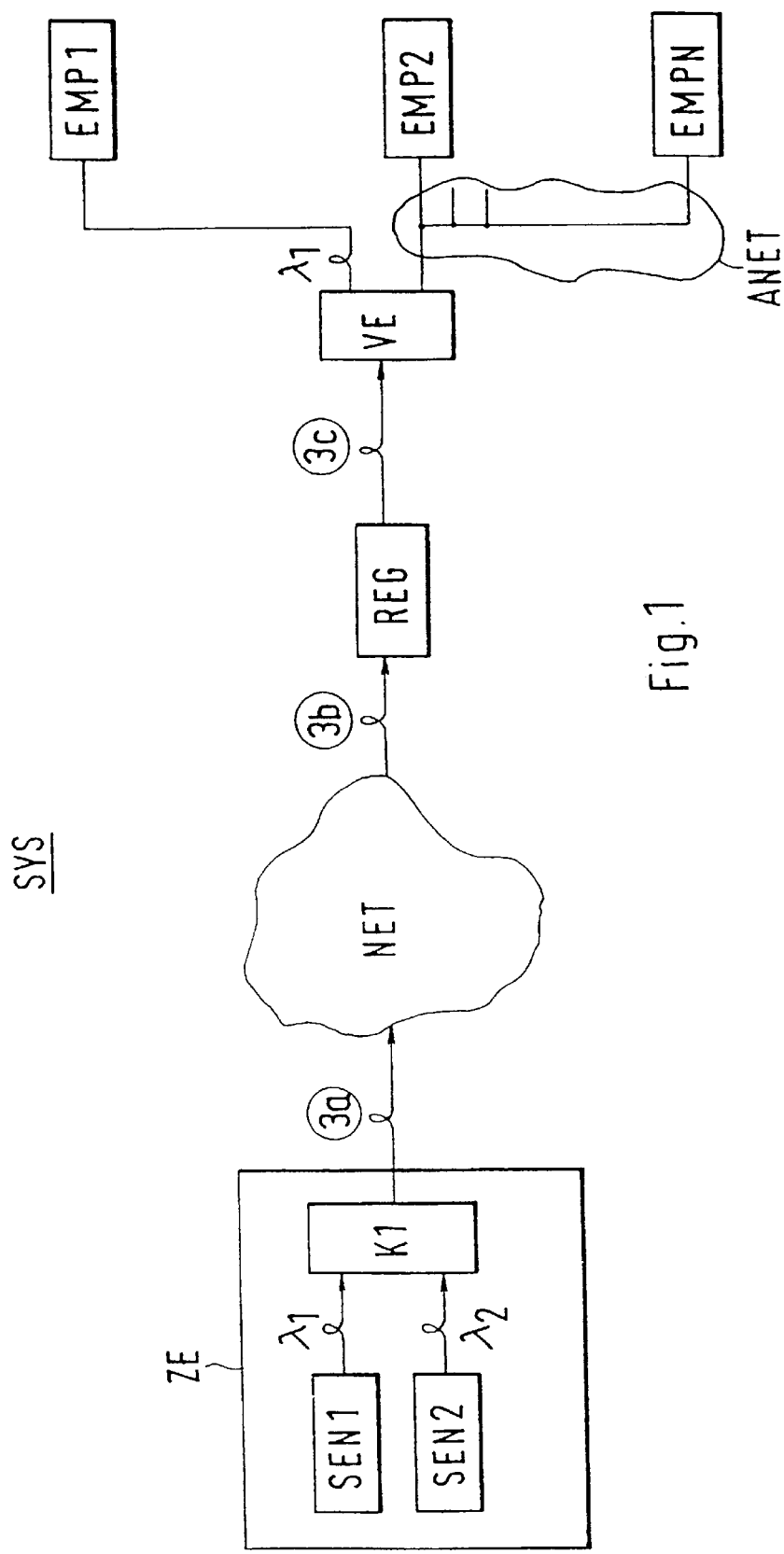
FIG. 1 is a schematic illustration of a transmission system according to the invention.

A configuration example of the invention will now be described by means of FIGS. 1 to 3. FIG. 1 illustrates a transmission system according to the invention. The transmission system SYS is a hybrid distribution system for example. Optical signals are transmitted from a central ZE to several receiving units EMP1 to EMPX via a distribution network NET.

The central ZE comprises a sending unit SEN1, a sending unit SEN2 and an optical coupler K1.

Optical signals with a wavelength $\lambda_1$ are produced in the sending unit SEN1. The contents of the optical signals are e.g. movie films, which are transmitted with high quality by the central ZE via a glass fiber path to the receiving unit EMP1 of a movie theater for display on a screen. The wavelength $\lambda_1$ e.g. has the value of 1530 nm. The sending central SEN1 contains a $\lambda_1$ laser whose output signal is modulated e.g. with the digitally available video and audio data of the movie films.

The sending unit SEN2 produces optical signals with the wavelength $\lambda_2$. The wavelength $\lambda_2$ e.g. has the value of 1560 nm. The contents of the optical signals are e.g. television programs which are transmitted by the central ZE to several receiving units EMP2 to EMPN of various subscribers via an optical glass fiber path and a subscriber line network ANET of coaxial cables. The sending unit SEN2 contains a $\lambda_2$ laser whose output signals are modulated with the video and audio data of the television programs.

In the optical coupler K1, the optical signals of sending unit SEN1 and the optical signals of sending unit SEN2 are combined into a composite signal which is routed to the distribution network NET.

The distribution network NET comprises several optical couplers, glass fiber paths and possibly intermediate amplifiers in which the optical signals are amplified. Wavelength-dependent attenuations take place in many optical components such as e.g. glass fiber lines or multi-stage cascaded fusion couplers for distribution factors of 1:8 or 1:16 e.g. This means that the levels of the individual optical signals are attenuated to different extents. For example optical signals with the wavelength $\lambda_2$ are attenuated more than optical signals with the wavelength $\lambda_1$. If optical signals with the wavelength $\lambda_1$ and those with the wavelength $\lambda_2$ are emitted by the central with the same signal levels, the optical signals with the wavelength $\lambda_2$ have a smaller signal level than the optical signals with the wavelength $\lambda_1$ after they pass through the distribution network NET. To compensate for the wavelength-dependent attenuation, the composite signal is routed through an amplifier device REG which in this case is designed as an optical regenerator.

The optical signals of the composite signal are amplified to different extents in the optical regenerator REG. The optical signals with the wavelength $\lambda_2$, which in this case have the higher attenuation for example, are amplified with a higher gain than those with the wavelength $\lambda_1$. To that end the levels of the optical signals are determined at the output of the optical regenerator REG and the wavelength-dependent attenuations for the two wavelengths $\lambda_1$ and $\lambda_2$ are adjusted as a function thereof. The output of the optical regenerator REG then contains a composite signal whose optical signals have the same level.

From the optical regenerator REG the composite signal is routed to a ramp device VE. The ramp device VE contains a wavelength-selective coupler and an optical-to-electrical transducer. The wavelength-selective coupler divides the composite signal into the optical signals with the wavelength $\lambda_1$ and into the optical signals with the wavelength $\lambda_2$. The optical signals with the wavelength $\lambda_1$ are transmitted to the receiving unit EMP1 of the movie theater via a glass fiber line. The optical signals with the wavelength $\lambda_2$ are converted by the optical-to-electrical transducer into electrical signals and are transmitted to the receiving units EMP2 to EMPX of the various subscribers via the subscriber line network.

FIG. 2 illustrates an amplifier device according to the invention. The amplifier in the configuration example is designed as an optical regenerator REG. The optical regenerator REG comprises a variable attenuator DG, a variable-gain optical amplifier EDFA, a control unit CTRL and an asymmetric coupler K2 with a distribution ratio of 1:10 for example. The optical regenerator REG has a composite signal input E and a composite signal output A. The composite signal input E is connected to the composite signal output A via a series circuit comprising a variable attenuator (DG), a variable-gain optical amplifier (EDFA) and an asymmetric coupler K2. In the configuration example the optical amplifier EDFA is an erbium-doped fiber amplifier. The gain of the optical amplifier EDFA can be adjusted via the pumped output supplied thereto. This gain of the optical amplifier EDFA is wavelength-dependent as a function of the levels of the input signals and the pumped output. The gain describes a nonlinear course along the wavelength. The shape of the gain curve in the wavelength window of 1520 nm to 1570 nm can be individually adjusted with the levels of the input signals and the pumped output. The wavelength-dependent attenuations are compensated for if the amplifications for the wavelengths $\lambda_1$ and $\lambda_2$ are chosen so that the same signal level appears at the output of the optical amplifier EDFA for both wavelengths $\lambda_1$ and $\lambda_2$.

The optical attenuator DG uniformly attenuates the level of the composite signal by a factor greater than one. The adjustment of the factor takes place e.g. via an electrical control voltage.

The composite signal at the input of the optical regenerator REG is routed in series to the output of the regenerator REG via the optical attenuator DG, the optical amplifier EDFA and the asymmetric coupler K2.

The composite signal is divided in the asymmetric coupler K2. For example 90% of the composite signal is routed to the output of the optical regenerator REG and 10% of the composite signal is routed to the control unit CTRL. The control unit CTRL has two outputs, one for controlling the optical attenuator DG and one for controlling the optical pump output of the optical amplifier EDFA.

The control unit CTRL comprises one wavelength-selective coupler K3, two optical-to-electrical transducers OE1 and OE2, one correction unit KOR, one pumped light source PUMP and a controller STE.

The 10% of the composite signal is routed to the wavelength-selective coupler K3. The coupler K3 divides the 10% of the composite signal in accordance with the wavelengths. The optical signals with the wavelength $\lambda_1$ are routed to the optical-to-electrical transducer OE1 where they are converted into an electrical signal. The electrical signal is routed to the correction unit KOR. The optical signals with the wavelength $\lambda_2$ are routed to the optical-to-electrical transducer OE2 where they are converted into an electrical signal. The electrical signal is also routed to the correction unit KOR.

The correction unit KOR comprises a microcontroller with two internal analog-to-digital converters and an internal memory, e.g. a so-called EPROM (Erasable Programmable Read Only Memory). The output signals of the optical-to-electrical transducers OE1 and OE2 are converted into digital signals by the analog-to-digital converters. The digital signals determine the set of parameters for the pumped output of amplifier EDFA and the control voltage for the attenuator DG. The memory stores the values of the gain curves of amplifier EDFA for different input powers as a function of wavelength. The digital signals are compared with the stored values and the control signals for the pumped light source PUMP and the controller STE are determined therefrom.

The pumped light source PUMP delivers the required pumped light to the optical amplifier EDFA. The higher the output of the pumped light source PUMP, the more excited electrons are available in the optical amplifier EDFA for stimulated emission. The output of the pumped light source PUMP is adjusted as a function of the value determined by the correction unit KOR.

As a function of the value determined by the correction unit KOR, the controller delivers the attenuation adjusting electrical control voltage to the optical attenuator DG.

Figure 3A:
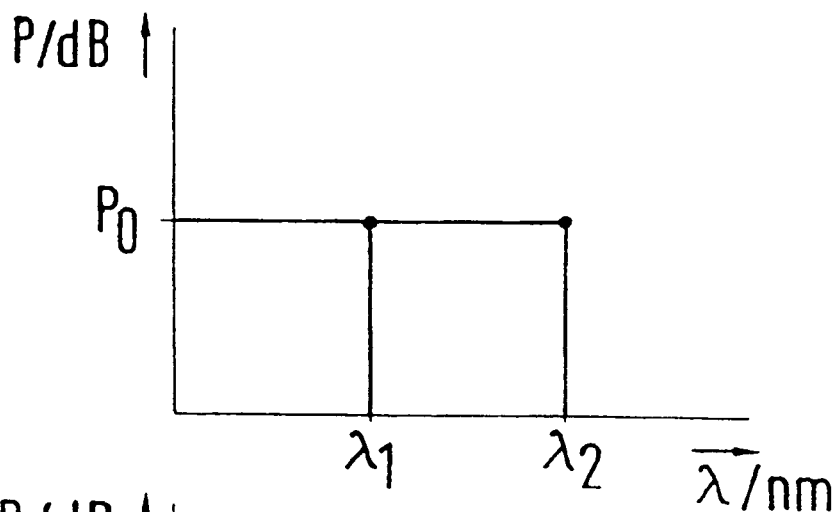

FIG. 3 illustrates three diagrams in which the signal levels are drawn over the wavelength. FIG. 3a) depicts a diagram of the composite signal level at the output of the central ZE in FIG. 1. The level of the optical signals with the wavelength $\lambda_1$ and the level of the optical signals with the wavelength $\lambda_2$ are the same. They each have the value of $P_0$.

Figure 3B:
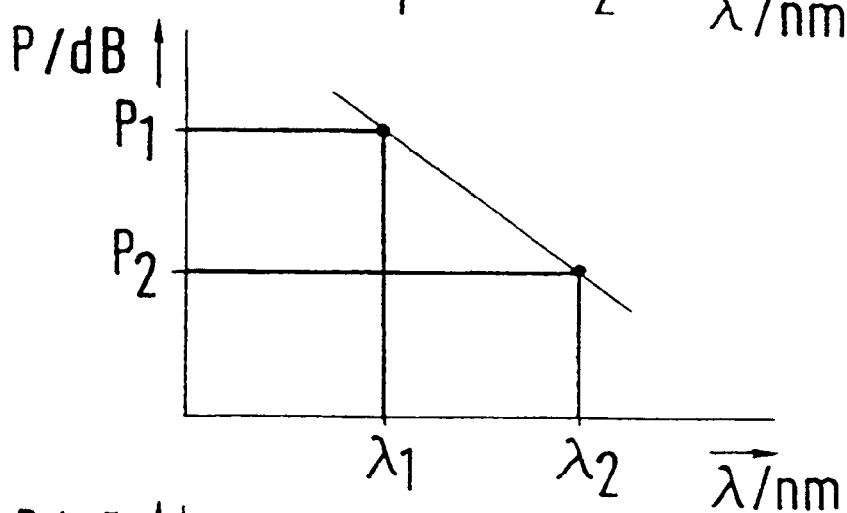

FIG. 3b) depicts a diagram of the composite signal level at the input to the optical regenerator REG in FIG. 1. Due to the wavelength-dependent attenuation in the distribution network, the level of the optical signal with the wavelength $\lambda_1$ is higher e.g. than the level of the optical signals with the wavelength $\lambda_2$. It has the value $P_1$. The level of the optical signals with the wavelength $\lambda_2$ has the value $P_2$. $P_1 > P_2$ applies. The amplification factors in the optical amplifier EDFA of FIG. 1 are adjusted for both wavelengths $\lambda_1$ and $\lambda_2$ by the attenuator DG and the pumped light source PUMP in FIG. 2 in a way so that the amplification factor for the wavelength $\lambda_1$ corresponds to $P_2/P_1$ times the amplification factor for the wavelength $\lambda_2$. This achieves that the level of the optical signals with the wavelength $\lambda_1$ and that of the optical signals with the wavelength $\lambda_2$ are the same at the output of the optical amplifier EDFA and correspond to $P_3$.

Figure 3C:
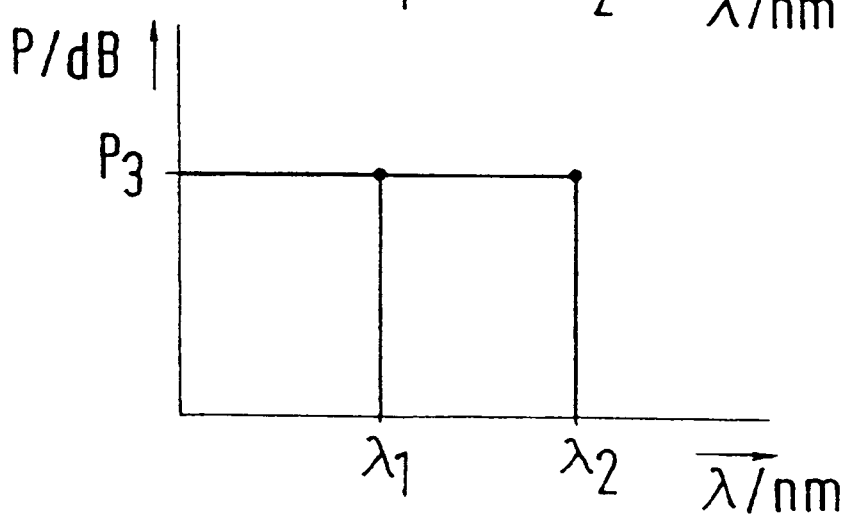

FIG. 3c) depicts a diagram of the level of the composite signal at the output of the optical regenerator REG in FIG. 1. The level of the optical signals with the wavelength $\lambda_1$ and that of the optical signals with the wavelength $\lambda_2$ are the same. Their value is $P_3$.

The transmission system in the configuration example is a hybrid distribution system. An optical distribution system, or a broad-band communications system with a return channel and a hybrid or purely optical structure can also be used instead of a hybrid distribution system. The invention can also be used with several consecutive regenerators, which allows the transmission range of the composite signal to be increased. The invention can furthermore be used as a preamplifier in an optical receiver. It is then advantageous that already existing optical-to-electrical transducers can be used, and that the composite signal with compensated attenuation is not further affected by optical components. Another advantage is that fluctuations in the wavelength-dependent attenuation can be smoothed out.

An erbium-doped fiber amplifier is used as the optical amplifier in the configuration example. Instead of the erbium-doped fiber amplifier any other optical amplifier can also be used, e.g. a fiber amplifier doped with a rare earth element.

In the configuration example the composite signal contains two wavelengths. The composite signal can also contain more than two wavelengths. In that case the control unit can be modified e.g. in the following two ways:

1) The control unit contains two wavelength-selective couplers. One wavelength-selective coupler filters the optical signals with the lowest wavelength from the composite signals, and the other those with the highest wavelength. The filtered optical signals are converted from optical to electrical and subsequently routed to the correction unit in which the further processing takes place as described for the configuration example.

2) The control unit contains several wavelength-selective couplers for filtering the individual optical signals with different wavelengths, and for each wavelength one optical-to-electrical transducer for converting the optical signals into electrical ones. The electrical signals are routed to the correction unit which contains a computer unit. The computer unit stores the levels of all electrical signals in EPROMs and determines the control signals for the pumped light source and the controller by interpolation and comparison with the stored gain curve values.

The invention can therefore be used to compensate for any attenuation losses in any composite signals.

What is claimed is:

1. An optical amplifier device (REG) for transmitting composite signals consisting of optical signals with different wavelengths, said optical amplifier device (REG) comprising a variable attenuator (DG), a variable-gain optical amplifier (EDFA), a coupler (K2), a composite-signal input (E), a composite-signal output (A), and a control unit (CTRL) for determining control signals for the variable attenuator (DG) and the variable-gain optical amplifier (EDFA), wherein the composite-signal input (E) is connected to the composite-signal output (A) via a series combination of the variable attenuator (DG), the variable-gain optical amplifier (EDFA), and the coupler (K2), wherein a portion of the composite signal at the output of the variable-gain optical amplifier (EDFA) is feedable via the coupler (K2) to the control unit (CTRL), and wherein the control signals for controlling said variable attenuator (DG) and said variable-gain optical amplifier (EDFA) are determinable in the control unit (CTRL) from the individual levels of the differing wavelengths of the optical signals of the portion of the composite signal.

2. An optical amplifier device (REG) as claimed in claim 1, characterized in that the optical amplifier is a fiber amplifier doped with a rare-earth element.

3. An optical amplifier device (REG) as claimed in claim 1, characterized in that the control unit (CTRL) comprises a wavelength-selective coupler (K3) for filtering the optical signals out of the composite signal.

4. An optical amplifier device (REG) as claimed in claim 1, characterized in that the control unit (CTRL) comprises optical-to-electrical transducers (OE1, OE2) for separately converting the individual levels of the optical signals of the portion of the composite signal to electrical signals and a correction unit (KOR) for determining the control signals from the levels of electric signals.

5. An optical amplifier device (REG) as claimed in claim 4, characterized in that the correction unit (KOR) comprises a memory in which values of the gain curves of the variable-gain optical fiber amplifier (EDFA) are stored for different input levels and wavelengths, and that the control signals are determinable by comparing the levels of the optical signals of the portion of the composite signal with the stored values.

6. An optical amplifier device (REG) as claimed in claim 1, characterized in that the optical signals are transmitted with wavelengths in the range of 1520 to 1570 nm.

* * * * *